(No Model.)
J. B. STOBAEUS.
APPARATUS FOR CHARGING BEER WITH CARBONIC ACID.
No. 482,881. Patented Sept. 20, 1892.
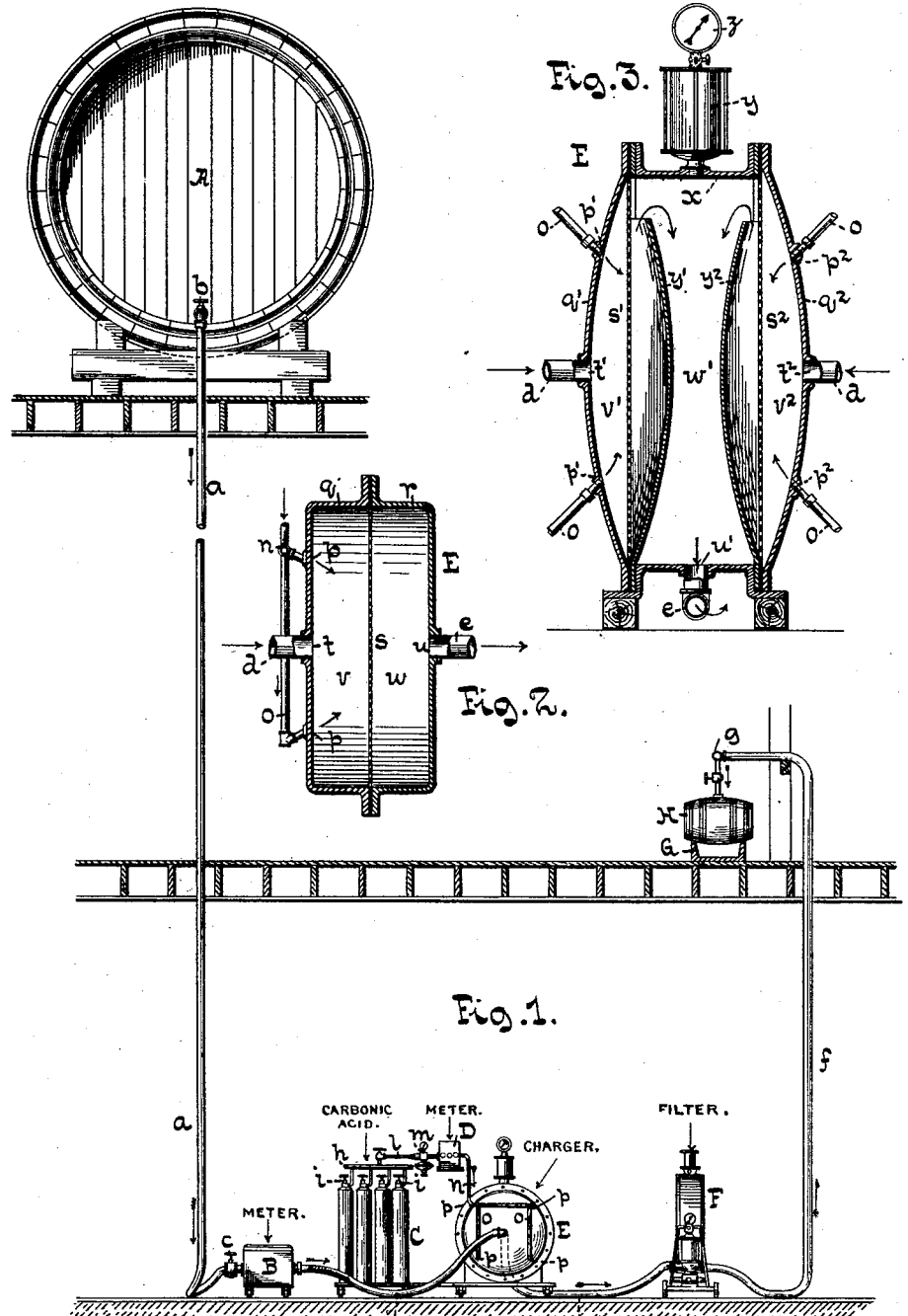
WITNESSES:
A. Faber du Faur
Fred. C. Wackenhuth
INVENTOR:
John B. Stobaeus,
BY A. Faber du Faur Jr.
ATTORNEY.
THE NORRIS PETERS CO., PHOTO-LITHO., WASHINGTON, D. C.

UNITED STATES PATENT OFFICE.

JOHN B. STOBAEUS, OF NEWARK, NEW JERSEY.

APPARATUS FOR CHARGING BEER WITH CARBONIC ACID.

SPECIFICATION forming part of Letters Patent No. 482,881, dated September 20, 1892.

Application filed September 26, 1891. Serial No. 406,953. (No model.)

*To all whom it may concern:*

Be it known that I, JOHN B. STOBAEUS, a citizen of the United States, and a resident of Newark, county of Essex, and State of New Jersey, have invented new and useful Improvements in Apparatus for Charging Beer with Carbonic Acid, of which the following is a specification.

My invention relates to improvements in apparatus for saturating beer or other liquids with carbonic acid, as set forth in the following specification and claims and illustrated in the annexed drawings, in which—

Figure 1 is a front elevation of the apparatus. Fig. 2 is a sectional elevation of the charger, and Fig. 3 a sectional elevation of a modification of the same.

Similar letters indicate corresponding parts.

In Fig. 1 the letter A indicates a cask for supplying beer under pressure; B, a meter for measuring the supply of beer; C, a battery of cylinders containing liquid carbonic acid; E, a carbonic-acid charger; F, a filter; G, a trough supporting the kegs H, into which the charged beer is to be filled.

$a$ is a pipe or hose connecting the cask A with the meter B.

$b$ and $c$ are stop-cocks.

$d$ is a hose connecting the exit from the meter B to the inlet of the charger E.

$e$ is a hose connecting the outlet from the charger E with the filter F, and $f$ a hose leading from the filter to a branch pipe $g$, from which the charged beer is drawn into kegs H in the usual manner.

$i\ i$ are stop-valves on the carbonic-acid cylinders of the battery C. The outlets from these cylinders are connected to a branch pipe $h$, from which a pipe $l$ leads to a meter D, a reducing-valve $m$ being placed between the pipe $h$ and the meter D, from which latter the carbonic acid passes to the charger through tubes $n$, branches $o$, and inlets $p$.

The meters B and D may be of any suitable construction. Instead of using a meter D the battery C may be placed upon a platform-scale for indicating the reduction of weight by sliding weights, spring-indicator, or by water column, (diaphragm scale.)

The filter F shown in the drawings is one of the class known as the "filter system Stockheim;" but any other suitable filter may be used.

One form of a charging apparatus E is shown on a larger scale in Fig. 2, where $q$ and $r$ are two parts of a casing with an interposed foraminous diaphragm $s$ of wire-gauze or other suitable material; $d$, the hose through which the beer is delivered under pressure to the central inlet $t$, and $u$ the outlet from which the charged beer passes through the hose $e$ to the filter F.

$v$ is the charging-chamber, formed by the part $q$ of the casing and the diaphragm $s$; $w$, the outlet-chamber, formed by the diaphragm $s$ and the part $r$ of the casing.

$p\ p$ are inlet-openings for the carbonic acid, all connected with the supply-tube $n$.

In Fig. 3 I have shown a modification of the charger, the casing of which consists of three parts $q'$, $q^2$, and $x$, with two diaphragms $s'$ and $s^2$, forming two inlet-chambers $v'$ and $v^2$ and one outlet-chamber $w'$, which latter may be subdivided by deflectors $y'\ y^2$, so as to direct the current first to the top and then downward to the outlet $u'$. $t'$ and $t^2$ are inlets for the beer and $p'\ p^2$ inlets for the carbonic acid into the chambers $v'\ v^2$. The inlets $p'\ p^2$ may be at or near the bottom of the heads $q'\ q^2$. $y$ is a glass cylinder connected to top of discharge-chamber $w'$, and $z$ a pressure-gage.

The diaphragm, the inlet-opening, and the deflector on one side of the apparatus shown in Fig. 3 may be omitted, thus making it single-acting, like the apparatus shown in Fig. 2, but provided with a deflector and with an outlet-opening at the bottom.

The carbonic acid may be distributed from a branch pipe located within the charging-chamber, so as to have but one opening in the chamber for the introduction of carbonic acid, and any suitable number of discharge-openings for the carbonic acid may be used.

The meter B, carbonic-acid battery C, charger E, and filter F are by preference placed upon trucks, so as to be readily moved. As shown in Fig. 1, the cask A, from which the beer is drawn, is placed at a higher level than the charging apparatus E, the filter, and the pipe g, so as to supply the beer under pressure. In practice this cannot always be conveniently done and the beer is supplied under pressure by means of a suitable pump.

In operation the beer supplied under pressure through hose a is measured by the meter B, the supply being regulated by the valve c or by the strokes of the pump. It then enters the charger E, where it meets a jet or jets of carbonic acid and passes through the foraminous diaphragm, whereby the thorough admixture and absorption of the carbonic acid is effected. The pressure in the discharge-chamber is generally about eighteen to twenty-five pounds per square inch, and the temperature should be as low as usual in beer-cellars, about 40° Fahrenheit. From the charger the beer passes through the filter F to the branch pipe g, from which it is distributed into kegs H in the usual manner.

Instead of at once filling the charged beer into kegs it may be run into a large cask and kept under pressure until it is to be drawn into kegs.

In place of having a battery of carbonic-acid cylinders carbonic acid may be supplied under pressure and at a low temperature from any other suitable source, and instead of being delivered from the top of the cylinders, as shown, it may be drawn from the bottom.

What I claim as new, and desire to secure by Letters Patent, is—

1. A carbonic-acid charger consisting of a casing with an interposed diaphragm, forming an inlet-chamber for the liquid to be impregnated and an outlet-chamber, the part of the casing forming the inlet-chamber being provided with a series of carbonic-acid nozzles inclined inwardly toward the center, said nozzles being arranged at equal distances from each other and at equal distances from a central inlet-opening, substantially as shown and described.

2. A carbonic-acid charger consisting of a casing with interposed foraminous diaphragm or diaphragms, forming an inlet chamber or chambers for the liquid to be saturated and an outlet-chamber, the inlet-chamber being provided with means, substantially as shown and described, for the introduction of carbonic acid and the outlet-chamber with one or more deflectors, substantially as specified.

In testimony that I claim the foregoing as my invention I have signed my name, in presence of two witnesses, this 21st day of September, 1891.

JOHN B. STOBAEUS.

Witnesses:
PAUL E. GERHARDT,
FRED. C. WACKENHUTH.